May 18, 1948.    W. C. VAN DRESSER    2,441,780
SUN VISOR
Filed Jan. 29, 1945
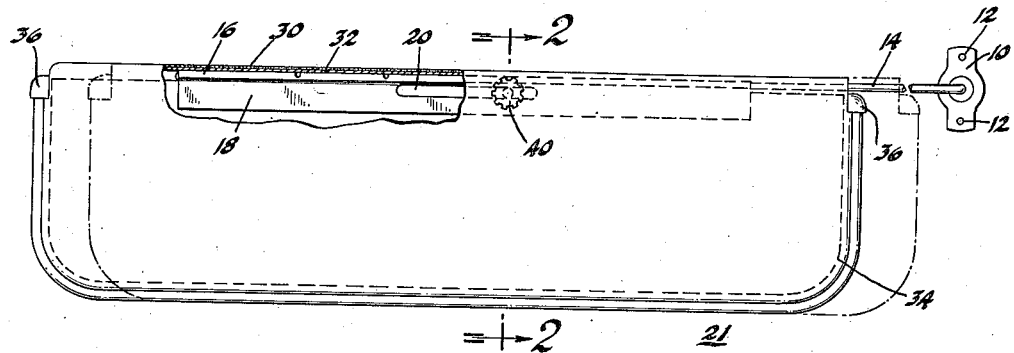
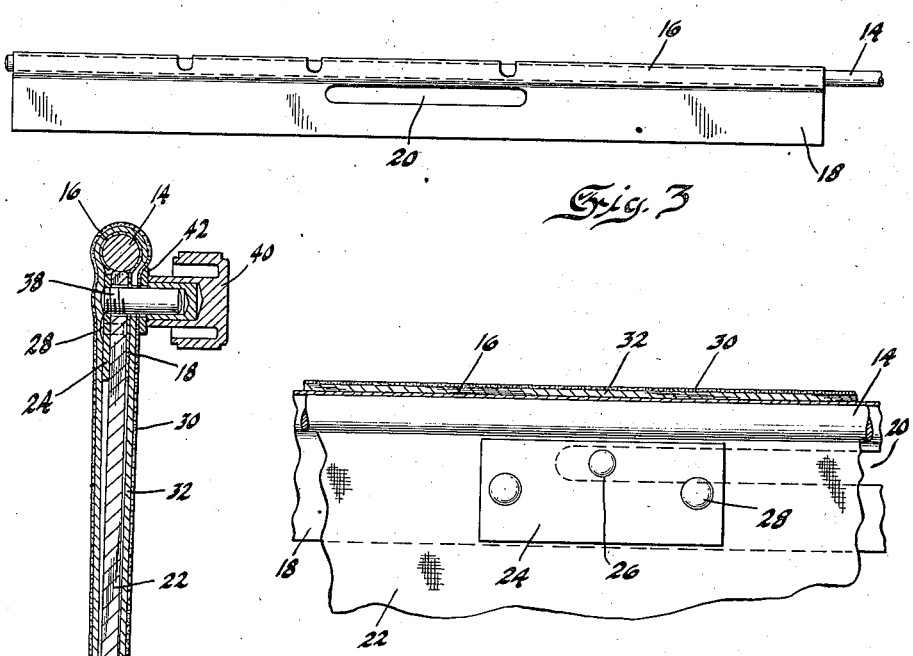
INVENTOR.
William C. Van Dresser
BY
Parker & Burton
attorneys Patented May 18, 1948

2,441,780

UNITED STATES PATENT OFFICE 2,441,780

SUN VISOR

William C. Van Dresser, Grosse Pointe, Mich.; Howard D. Stoddard, administrator of said William C. Van Dresser, deceased, assignor to Van Dresser Specialty Corporation, Detroit, Mich., a corporation of Michigan Application January 29, 1945, Serial No. 574,985

1 Claim. (Cl. 296—97)

This invention relates to improvements in sun visors or glare shields such as are commonly used in automobiles.

An object is to provide an improved sun visor which may be so supported within a vehicle as to obstruct the objectionable light rays entering through the windshield or through a side window of the vehicle and which comprises a visor blade mounted upon a supporting rod for rotatable angular adjustment thereabout and longitudinal adjustment therealong.

A further object is to provide a sun visor of the character described wherein the visor blade is rotatably adjustable about the rod to a plurality of angular positions with respect thereto and is frictionally held at each of said angular positions of rotation secure against accidental displacement, and wherein the blade is freely adjustable longitudinally along the rod and may be secured at any longitudinally adjusted position by simple manually operable mechanism.

Another object is to provide sun visor mechanism of the character set forth which comprises a minimum number of easily assembled parts which is inexpensive to manufacture, and which is of simple construction.

Other objects, advantages and meritorious features will more fully appear from the following description, appended claim and accompanying drawings, wherein:

Figure 1 is a side elevation of a visor assembly embodying the invention.

Figure 2 is a cross-sectional view taken on line 2—2 of Figure 1.

Figure 3 is an elevation of a fragment of the visor supporting rod with the split tube mounted thereupon.

Figure 4 is a section partly in elevation through a fragment of the visor including a portion of the visor rod and tube.

This improved visor is illustrated as embodied in a structure designed for use in the interior of a closed automobile body. It comprises a bracket member 10 which may be secured within the interior of the body by screws or the like 12. Such a bracket is commonly installed on the header adjacent to one end and above the windshield window opening. The bracket is constructed to provide a pivotal mounting for one end of the visor supporting rod 14 whereby the rod may be swung to a plurality of angular positions with respect to the bracket.

A split tube 16 is rotatably mounted upon the rod. This tube is so constructed as to resiliently grip the rod so that it will frictionally retain any position to which it is rotated angularly about the rod. One margin of the tube is extended as shown in Figures 2 and 3 forming a lip 18. The lip of the tube is cut away at 20 forming a slot which extends lengthwise of the lip of the tube. The frictional gripping engagement of the tube about the rod is such that while the tube may be resistingly rotated about the rod it cannot be readily moved longitudinally along the rod.

A visor blade assembly indicated as 21 in Figure 1 is mounted upon the rod enveloping the tube and is angularly rotatable about the rod. This blade assembly is also slidably adjustable longitudinally over the rod and tube.

The blade assembly comprises a reinforcing panel board 22 which is relatively rigid and may be formed of fibre board or other composition material. Secured to one face of the board by rivets 28 or the like is a plate 24 which plate is provided with a threaded screw opening 26. Covering material is folded about the plate and adapted to be received over the rod as shown in Figures 2 and 4.

This covering material is shown in the drawing as including a layer of fabric 30 overlying a flexible layer of material such as asphalt composition board 32. This two-ply covering is folded over the reinforcing panel 22 so as to provide a tubular marginal portion within which the rod and split tube may be received as shown in Figures 3 and 4. The covering material may be stitched together about the free marginal portion of the panel 32 as at 34. A finish strip may be provided and fitted at the ends with metal tabs 36.

It will be seen that the lip 18 of the split tube is of less length than the visor blade assembly, and the slot 20 in the lip represents only a portion of the length of the web. Manually operable means in the form of a screw 38 having a head 40 extends through a provided opening in the covering material and through the slot 20 in the lip of the split tube and is threaded into the opening 26 in the plate 24 to be carried thereby. The lip 18 of the split tube overlies the reinforcing panel 22 but is entirely free therefrom except through the connection of the screw 38 as hereinabove set forth. Underneath the head 40 is a washer 42. When the screw is loosened it is apparent that the visor blade may be moved longitudinally along the lip of the split tube, the distance which is permitted by the length of the slot 20. It is also apparent that the screw may be tightened at any position of movement lengthwise along the length of the tube to secure the visor at such adjusted positions. The visor is shown in Figure 1 in dotted outline at a position of longitudinal adjustment.

The visor blade may be rotated about the rod at any position of longitudinal adjustment along the rod and the split tube will maintain the blade at any such position of angular rotation about the rod. When pressure is exerted upon the blade counterclockwise, looking at Figure 2, the blade will rotate freely about the rod because in this direction of rotation the blade tends to unwrap the tube from about the rod. When the blade is rotated in a clockwise direction it tends to wrap the tube about the rod and the resistance to rotation is increased. In the visor the arrangement is such that the blade will rotate freely to be lifted but will resist rotation more strongly as it is being lowered. This prevents accidental downward displacement of the blade due to the jar and shock of travel over the road.

What I claim is:

Visor mechanism comprising, in combination, a supporting rod, a split tube mounted upon the rod for frictionally resisted rotatable adjustment about the rod and adapted to frictionally maintain adjusted position of adjusted rotation thereabout, said tube having one margin portion extending lengthwise of the rod and projecting radially therefrom forming a lip, said lip provided with a slot extending parallel to the rod, a visor blade supported upon the rod and adapted for adjustment lengthwise thereover and for rotatable adjustment with the tube about the rod, said blade having a screw carrying portion overlying the slotted lip of the tube to cause the tube to rotate with the blade about the rod and to cause the blade to maintain the angular position of rotatable adjustment of the tube about the rod, a manually operable thumb screw extending through the slot in the lip and threaded into the screw carrying portion of the blade and provided with a thumb grip disposed externally of the blade and provided also with means adapted upon threaded rotation of the screw in one direction to draw the blade frictionally against the lip of the tube holding the blade against lengthwise adjustment over the tube and upon rotation in the opposite direction adapted to release the frictional engagement of the blade and lip to permit lengthwise movement of the blade over the lip.

WILLIAM C. VAN DRESSER.

REFERENCES CITED

The following references are of record in the file of this patent:

UNITED STATES PATENTS

| Number | Name | Date |
| --- | --- | --- |
| 2,322,898 | Van Dresser | June 29, 1943 |
| 2,340,015 | Pelcher et al. | Jan. 25, 1944 |